United States Patent
Ashe et al.

(10) Patent No.: US 9,956,533 B2
(45) Date of Patent: May 1, 2018

(54) TUBULAR REACTOR AND PROCESS

(75) Inventors: Robert Ashe, Runcorn (GB); David Morris, Runcorn (GB)

(73) Assignee: Ashe Morris Ltd., Cheshire (GB)

( * ) Notice: Subject to any disclaimer, the term of this patent is extended or adjusted under 35 U.S.C. 154(b) by 1231 days.

(21) Appl. No.: 13/639,342

(22) PCT Filed: Apr. 6, 2011

(86) PCT No.: PCT/EP2011/001702
§ 371 (c)(1),
(2), (4) Date: Oct. 30, 2012

(87) PCT Pub. No.: WO2011/124365
PCT Pub. Date: Oct. 13, 2011

(65) Prior Publication Data
US 2013/0044559 A1 Feb. 21, 2013

(30) Foreign Application Priority Data
Apr. 6, 2010 (GB) .................................. 1005742.0

(51) Int. Cl.
*B01F 11/00* (2006.01)
*B01F 13/00* (2006.01)
(Continued)

(52) U.S. Cl.
CPC ........ *B01F 11/0077* (2013.01); *B01F 13/005* (2013.01); *B01F 13/0057* (2013.01);
(Continued)

(58) Field of Classification Search
CPC .............. B01F 11/0008; B01F 11/0014; B01F 11/0077; B01F 13/0057; B01F 13/1013;
(Continued)

(56) References Cited

U.S. PATENT DOCUMENTS

| 4,074,363 | A | * | 2/1978 | Croft | ..................... | B29B 7/7438 |
| | | | | | | 366/339 |
| 4,812,046 | A | * | 3/1989 | Henderickson | ..... | B01F 11/0042 |
| | | | | | | 366/338 |

(Continued)

FOREIGN PATENT DOCUMENTS

| DE | 236257 C | 7/1911 |
| DE | 1034153 B | 7/1958 |

(Continued)

OTHER PUBLICATIONS

Browne et al., Continuous Flow Processing of Slurries; Evaluation of Agitated Cell Reactor, Organic Process Research and Development.

(Continued)

*Primary Examiner* — Anshu Bhatia
(74) *Attorney, Agent, or Firm* — The Dobrusin Law Firm, P.C.

(57) ABSTRACT

A continuous mixer/reactor and a mixing process are provided in which materials flow in an orderly fashion along the length of a channel (9) and the materials are mixed in a direction transverse to the axis of the channel (9) by the provision of agitator elements (5, 7) within the channel (9) and shaking the channel (9) so that the agitator elements (5, 7) move within the channel (9) in the radial direction of the channel (9).

26 Claims, 3 Drawing Sheets

Agitated tube system showing multiple channel bundle on a shaking platform (details of shaking platform mechanism not shown)

(51) Int. Cl.
*B01F 13/10* (2006.01)
*B01J 8/04* (2006.01)
*B01J 19/00* (2006.01)
*B01J 19/18* (2006.01)
*B01J 19/28* (2006.01)

(52) U.S. Cl.
CPC ...... *B01F 13/1013* (2013.01); *B01F 13/1027* (2013.01); *B01J 8/0403* (2013.01); *B01J 19/006* (2013.01); *B01J 19/0066* (2013.01); *B01J 19/0093* (2013.01); *B01J 19/1818* (2013.01); *B01J 19/285* (2013.01); *B01J 2208/00814* (2013.01); *B01J 2208/028* (2013.01); *B01J 2219/002* (2013.01); *B01J 2219/00063* (2013.01); *B01J 2219/00094* (2013.01); *B01J 2219/00135* (2013.01); *B01J 2219/00189* (2013.01); *B01J 2219/00238* (2013.01)

(58) Field of Classification Search
CPC ... B01F 13/1027; B01F 8/0403; B01J 8/0403; B01J 19/006; B01J 19/0066; B01J 19/0093; B01J 19/1818; B01J 19/285; B01J 2208/00814; B01J 2208/028; B01J 2219/00063; B01J 2219/00094; B01J 2219/00135; B01J 2219/00189; B01J 2219/002
USPC .................. 366/336, 337, 338, 339, 340
See application file for complete search history.

(56) References Cited

U.S. PATENT DOCUMENTS

| | | | |
|---|---|---|---|
| 5,628,562 | A | 5/1997 | Krumm |
| 6,357,907 | B1 | 3/2002 | Cleveland |
| 2003/0064507 | A1 | 4/2003 | Gallagher |
| 2004/0161511 | A1* | 8/2004 | Peterson .............. A23G 1/0016 426/392 |
| 2005/0220668 | A1 | 10/2005 | Coville |
| 2005/0277187 | A1 | 12/2005 | Johnson |
| 2007/0276118 | A1 | 11/2007 | Debruin |
| 2011/0310696 | A1* | 12/2011 | Goodwin ............ B01F 7/00691 366/204 |

FOREIGN PATENT DOCUMENTS

| | | |
|---|---|---|
| DE | 1208606 B | 1/1966 |
| EP | 1729136 A1 | 12/2006 |
| JP | H10-286479 A | 10/1998 |
| JP | 2004/195384 A | 7/2004 |
| JP | 2007/054817 A1 | 3/2007 |
| JP | 2009-115821 A | 5/2009 |
| WO | 98/06485 A1 | 2/1998 |
| WO | 2003/054509 | 7/2003 |
| WO | 2006/120026 A2 | 11/2006 |
| WO | 2006/120027 A1 | 11/2006 |
| WO | 2006/120028 A1 | 11/2006 |
| WO | 2006/120945 | 11/2006 |
| WO | 2008/068019 A1 | 6/2008 |

OTHER PUBLICATIONS

Ashe, Shaken not Stirred, Jul. 2010; Reactor Design; www.tcetoday.com.
International Search Report dated Jul. 19, 2011, International Application No. PCT/EP2011/001702.
PCT International Preliminary Report on Patentability dated Oct. 18, 2012 PCT/EP2011/001702.
"Continuous Stirred-Tank Reactor." *Wikipedia, the Free Encyclopedia*. Last accessed on Jun. 1, 2017. https://en.wikipedia.org/wiki/Continuous_stirred-tank_reactor.
Denbigh, K.G., and Turner, J.C.R. *Chemical Reactor Theory: An Introduction*. 3$^{rd}$ ed., Cambridge University Press, 1984, pp. 8-9, 35.
Sauer, Jörg, et al. "Chemical Reactor Types." *Ullmann's Encyclopedia of Industrial Chemistry*. Wiley, 2015, pp. 1-2.
Japanese Notification of Reason for Rejection, Application No. 2016-153510 dated Aug. 31, 2017.
Japanese Notification of Reason for Rejection, Application No. 2013-503031 dated Apr. 3, 2015.

* cited by examiner

FIGURE 1 - Agitated tube system
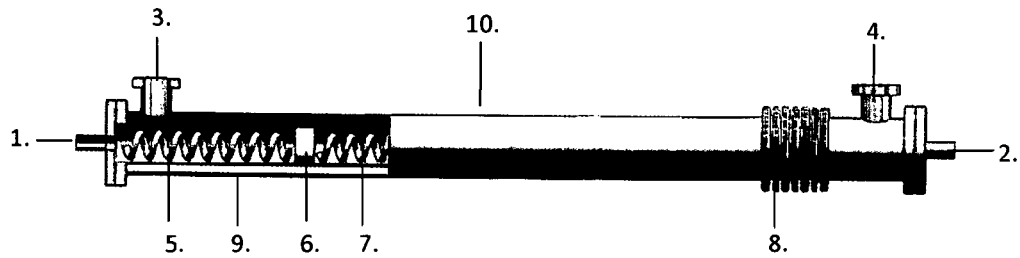
FIGURE 2 - Agitated tube system showing multiple channel bundle on a shaking platform (details of shaking platform mechanism not shown)
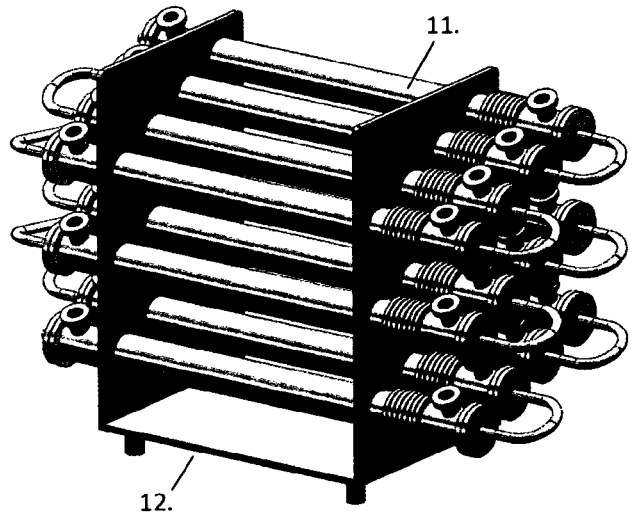
FIGURE 3 - Cutaway section of a channel showing the internal agitator with spring agitators
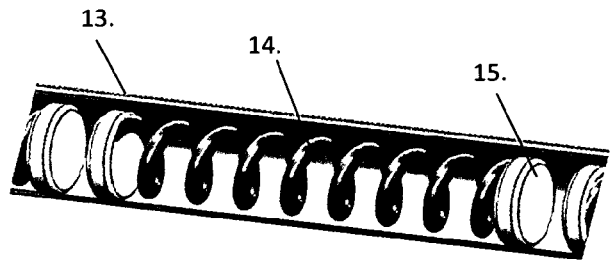

FIGURE 4 - Cutaway section of a tube showing the internal agitator with spoke agitators
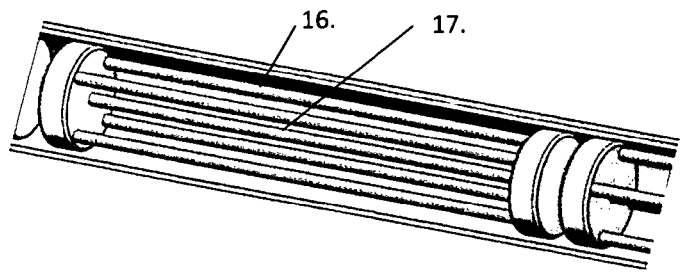
FIGURE 5 - Mixing element with static agitator guide
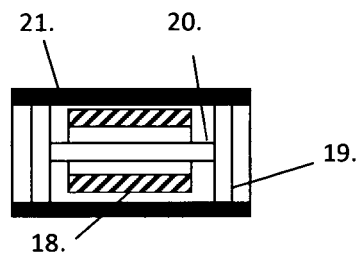
FIGURE 6 - Counter Current System
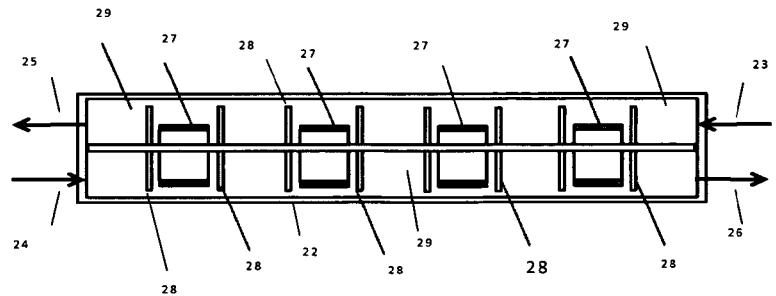

FIGURE 7 - Residence time vs. conversion for the ATR and 1 litre batch
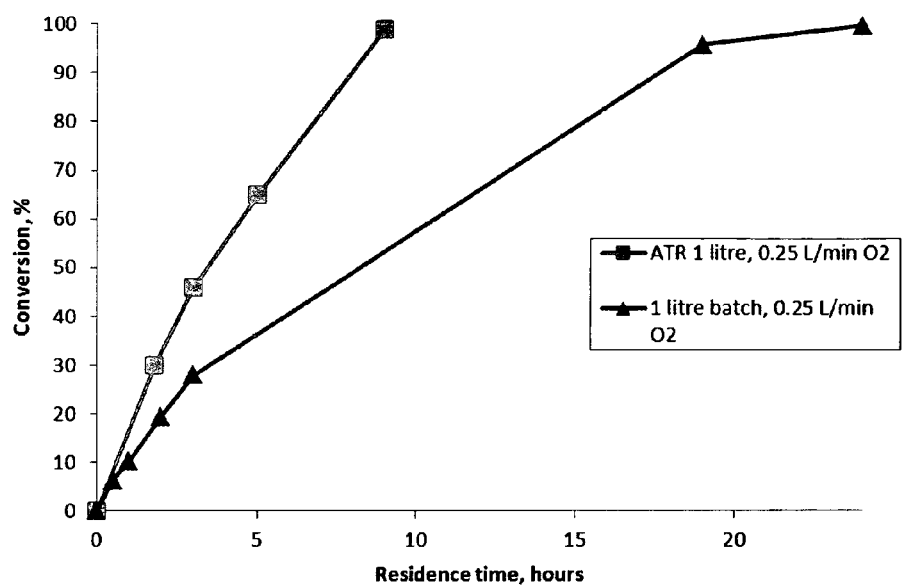
FIGURE 8 - Reactor Volumes processed vs. Conversion in the 1 litre ATR
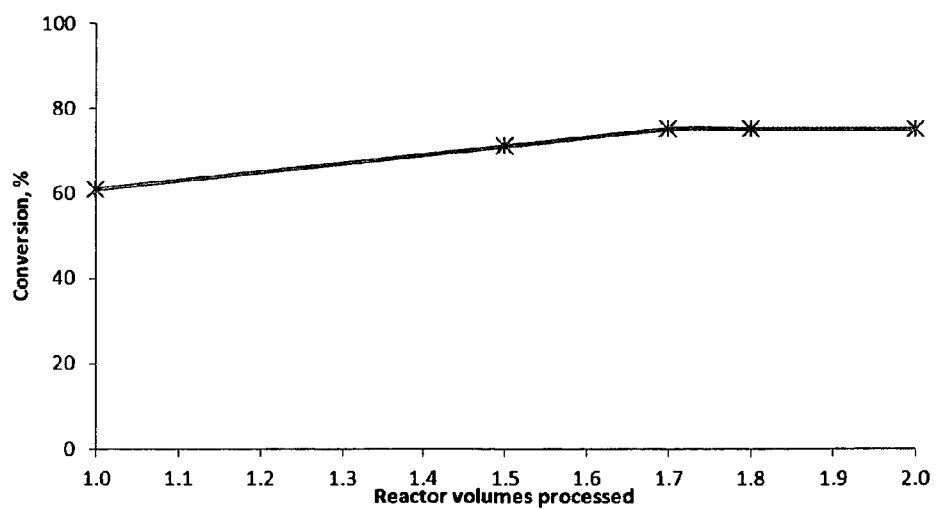

TUBULAR REACTOR AND PROCESS

CLAIM OF PRIORITY

This application is a national phase filing under 35 USC § 371 from PCT Application serial number PCT/EP2011/001702 filed on 6 Apr. 2011, and claims priority therefrom. This application further claims priority from GB 1005742.0 filed on 6 Apr. 2010 both incorporated herein by reference.

This invention is concerned with flow systems which are used for the transfer by the continuous movement or flow of liquids, slurries, gas/liquid mixtures, super critical fluids, gases, immiscible fluids (or mixtures of these materials) in channels under dynamically mixed conditions. Examples of applications include (but are not limited to) continuous flow systems which are chemical reactors, extractors, mixers, crystallisers, bio reactors, heaters and coolers. Examples also include fluid transfer systems where orderly flow is required and there is a need to prevent phase separation, thickening or setting. This invention is particularly concerned with continuous flow systems which involve orderly flow with mixing in a direction substantially transverse to the direction of flow.

Ideal plug flow refers to a flow condition where the velocity of a flowing fluid is uniform across the face of the channel and no back mixing occurs. It should be recognised however that ideal plug flow is neither desirable for larger tubes (some lateral movement in larger channels is necessary for mixing) nor possible (e.g. wall friction affects the velocity profile). In this document, plug flow refers to a condition which approximates to ideal plug flow. In this context, plug flow means orderly flow such that fluid elements travel through and leave a channel in substantially the same order that they enter the channel. It also applies to systems where two phases are traveling in opposite directions (counter current flow) but each phase approximately obeying the rules for plug flow in its respective direction (other than components which may transfer between phases). The invention therefore minimises the degree of back mixing of the material within the channels, furthermore the radial mixing can reduce the effect of stagnant zones or surface drag and in so doing improve the quality of plug flow.

This invention relates to flow in channels. The term axial refers to the long axis of the channel. The net direction of fluid through the channel is axial. The term radial refers to the plane which is substantially at 90° to the axial axis.

The term static mixing in this document refers to systems where the flow direction of fluid within a channel s changed without moving mixer elements. Examples include turbulent flow, channel bends, baffles and static mixers. This invention relates to dynamic mixing in flowing channels. Most conventional dynamic mixers involve the use of rotating stirrers. The mixing method of this invention is achieved by shaking the channel. The channel contains agitators to enhance mixing and in this instance the preferred agitator movement is limited to the radial plane.

The term channel used in this patent describes the channel through which process material flows. It may be a tube or pipe. References to ratios such as channel diameter to length assume that the channel is circular. Where the channel is non circular, estimates of these or other parameters can be applied by reasonable judgement using the rationale and sizing criteria described herein.

Channel in the context of this patent refers to a tube or pipe which is mixed by shaking. A series of channels may be employed in series in which case each channel may be separated from another channel by a connecting pipe. The diameter of any connecting pipe is preferably smaller than the channel so as to maintain orderly flow in the absence of dynamic mixing within the connecting pipe. A series of channels may also be employed in parallel.

The system of this invention is referred to as an agitated tube system (ATS) or agitated tube reactor (ATR).

PCT Publication WO 2008/068019 describes an agitated cell reactor. It comprises two or more continuous stirred cells (CSTs) whereby mixing is achieved by shaking the cells. Providing materials of two different densities are present within the cells, the effect of shaking is to generate mixing. Fluid movement within individual stages within the agitated cell reactor do not follow a plug flow pattern. When multiple stages are used in series however, plug flow characteristics are achieved. The limitation of this design relates to scale up. In the agitated cell reactor, the fluid composition within a mixed cell must be substantially uniform to prevent bypassing or hold up. For this reason, the length of the cell should be similar to the diameter. This results in large diameter stages when the stage volumes are increased. Large diameter stages are less efficient than small diameter channels as they require greater shaker travel (which limits shaking frequency). Large diameter channels also increase weight and height of the system which affects stability and requires greater shaker power.

The present invention concerns a tubular system which uses a shaking mixing technique. Unlike WO 2008/068019, this is a tubular system which does not require multiple stages for plug flow (although stage separation may be used for reasons of compactness). In this design, channel length (not multiple discrete stages) forms the basis for maintaining plug flow of product through the channel. The inlet and outlet to the channel in this design are separated by the furthest practical distance on the axial path. The agitated tube system of this invention has the following benefits.

The preferred direction of mixing in the ATS is in the radial plane whereas the direction of mixing in the agitated cell reactor is preferably random. This means that the flow pattern within a single stage within the ATS is substantially plug flow. This results in plug flow through a single channel.

The position of the inlet pipe in relation to the outlet pipe is immaterial in an ideal agitated cell reactor. In the ATS, the Inlet and outlet pipes are separated by the maximum practical distance on the axial plane.

In the agitated cell design, the composition of material in the discharge pipe is substantially the same as any point in the cell. In the ATS, the composition of material in the discharge pipe is only the same as material within the ATS channel which is in immediate proximity to the discharge pipe.

U.S. Pat. No. 5,828,562 describes a dosing apparatus comprising a tube which can be fed with two materials and can be moved from left to right to cause mixing. Wires are attached to the inner walls of the tube and extend longitudinally through the tube to enhance the mixing. Although no dimensions are quoted, the design is not a plug flow system and the mixing elements as shown are specifically aimed to promote mixing in both the axial and radial planes.

The ATS design permits the use of long channels and it also can permit to the use of channels with comparatively small diameters. Long small diameter tubes contribute to lower weight, lower build cost, and inherently better mixing characteristics than the agitated cell design for capacities over 200 milliliters. ATS systems of less than 200 milliliters can also be used. ATS systems of less than 200 milliliters can also be used. Depending upon the use to which the ATS is to be put, it may be convenient to provide it with a temperature control jacket. This provides the means to regulate the process temperature and add or remove heat where required.

One or more of the channels of the ATS is mounted on a shaking platform and mixing is generated by shaking the channels. As with the agitated cell design, materials of more than one density must be present within the channel for mixing to occur. The design is illustrated by reference to the accompanying Figures. FIG. 1 shows an ATS channel. Product flows in at the inlet (1) and through the channel (9) to the outlet (2). Heating or cooling fluid (where required) is pumped through the heating/cooling jacket (10) via inlet (3) and outlet (4) connections. A variety of cooling/heating jacket designs can be used. Free moving agitator elements of a different density to other fluid components are located within the channel. In this example, a spring shaped mixer (5) is shown. FIG. 1 shows a series of separate mixers (5 and 7). Alternatively, different kinds of mixers can be used in a sin le channel. A mixer ring (6) can be used as shown in FIG. 1. Optional expansion bellows for the heating/cooling jacket (8) are shown. These accommodate differential expansion between the shell and jacket. The channel or channels are mounted on a moving platform (not shown in FIG. 1). The channel may also be connected to other channels to increase capacity as shown in FIG. 2. FIG. 2 shows multiple channels (11) such as that shown in FIG. 1 mounted on a shaking platform (12) which moves the assembly to and fro in a direction transverse to the long axes of the channels. The direction of movement may also be orbital or some other pattern in a direction transverse to the long axes of the channels. Details of the platform agitating mechanism are not shown. The process channel may have a variety of connections at different points such as for instruments, sampling or addition.

FIG. 3 shows a spring shaped agitator (14) within the reaction channel (13). At each end of the agitator is an optional agitator ring (15). Agitator rings (15) prevent the ends of adjacent agitators from dashing or binding. They can also provide a soft contact surface for the agitator elements when touching the sides of the channel. This can reduce wear and product damage. The agitator ring may have holes or cut outs to improve flow along the channel. The agitator ring may be made of a soft material like plastic or a hard material like metal. It may also use a rubber or plastic layers to cushion impact and generate recoil. The agitator ring can also be used to reduce back mixing or to trap one phase of fluid.

It is preferable that the combined effect of the agitators is to sweep 50% or more of the channel diameter. To achieve this, agitators containing mixing elements of more than one diameter can be used as shown in FIG. 4. This uses 4 outer mixing rods (16) and an inner rod (17). Alternatively concentric rings or springs within springs can be used as mixers. FIG. 5 shows a static agitator guide within a process channel (21). The agitator (18) has a hollow centre to permit free movement. The agitator guides (19) prevent adjacent agitators from touching. The agitator guide spacer (20) is a rod that connects the agitator guides. So as to permit the free movement of the agitator, it is preferable that the long axes of the agitator guide spacers are within the middle $\frac{1}{3}^{rd}$ of the channel diameter. It can be located at the perimeter but this will reduce heat transfer capacity or can obstruct movement of the agitator. The agitator guides and the agitator guide spacers may be designed to be inserted by sliding in from one end of the tube. The agitator guides can be solid discs with holes in the centre or cut outs at the perimeter to allow the passage of process material along the channel. They can also be spider shaped guides. The agitator guides can also be used to control axial movement of a mixing element when this is a fluid or gas of different density. In these cases it is preferable that the agitator guides provide a solid ring at the outer perimeter to act as weirs to retain gases or denser materials. In these cases, process materials pass across the guide through holes which are not at the perimeter.

In one embodiment the invention provides a dynamically mixed plug flow system where the loose agitator is a solid mechanical part designed for the purpose of mixing.

The invention further provides a dynamically mixed plug flow system where the agitator is a material (such as a gas) of different density to another fluid within the system. The axial flow of fluid of one density may be inhibited by means of agitator guides and/or orientation of the take off points at the end of the channel (e.g. a low level take off to prevent gas from escaping).

The invention further provides a dynamically mixed system where the agitator is a fluid (such as a gas) of different density to another process fluid within the system which may move with the process fluid with or without reacting or dissolving in the process fluid.

In a further embodiment the systems employ temperature control although systems without temperature control may also be used. Where temperature control is employed, an external cooling/heating jacket may be used in the form of an outer sleeve or coils. Alternatively it may be an electrical heater. Temperature control may be achieved by means of a temperature sensor which monitors the temperature of the process fluid. The signal from the temperature sensor can be used to vary the flow rate or temperature of the heating or cooling medium where said medium is a heat transfer fluid or to vary electrical power in the case of an electrical heater. Different temperature control strategies can be employed as different points along the tube.

Because the ATS uses dynamic mixing which is primarily in the radial plane; mixing efficiency is not dependent on linear velocity of fluid through the channel and plug flow is less dependent on linear velocity of the fluid through the channel compared to systems which do not use dynamic mixing in the radial plane. This means that, if required, different diameter channels can be used at different stages of the reactor (with substantially the same mixing and plug flow characteristics) to suit changing requirements such as heat transfer requirements.

Any direction of shaking can be employed, however, the preferred direction of shaking is in the radial plane and the agitator movement may be rotational, transverse or a variety of trajectories within the radial plane. Where there is movement of the agitator in the axial plane, it is preferable that this is limited to less than 10% of the channel length.

The frequency of shaking is linked to the level of mixing required. As a minimum however, the average velocity of the agitator in the radial direction should be greater than the axial velocity of the process material travelling through the channel and preferably 5 times greater than the axial velocity and even more preferably 10 times greater than the axial velocity. The average velocity of the agitator can also be up to 50 times greater than the axial velocity of the process flow or higher (high mixing velocities are particularly important for mass transfer limited processes). For processes which require fast or efficient mixing, shaking speeds of between 1 and 10 cycles per second (or higher) can be used but mixing times of up to 100 cycles per 25 second can be used.

The diameter of the channel may be less than 1 mm or larger than 1 m. The constraint with small diameter channels however is that they use smaller agitators which result in increased surface drag per unit mass. This results in reduced mixing efficiency (especially with more viscous fluids). Although systems with channel diameters of greater than 100 mm diameter can be used, these are subject to increased cost and are more difficult to mix by shaking. The preferred channel diameter is therefore from 10 mm to 100 mm and more preferably 25 mm to 80 mm.

Increasing the length of the reactor channel increases volumetric capacity. There is no limit to the length that can be used. However, for practical reasons, channel lengths of 2 meters or less are preferred since they have to be mounted on a shaking platform (where rigidity is desirable for good transmission of shaking energy). Where longer channels are necessary, it is preferable to break the channel up into a series of shorter channels of 2 meters or less in length and more preferably 1 meter or less in length. Where multiple channels are used, these are preferably linked by channels with reduced diameter (to ensure good plug flow and minimum transfer delay between mixed channels). We have found that the use of a system according to the present invention enables the use of substantially shorter and larger diameter channels than with previous tubular continuous flow systems The preferred capacity of a single channel is between 10 milliliters and 10 liters. More preferably, the capacity is between 100 milliliters and 1 liter.

To maintain plug flow, the length of the channel is preferably at least twice the channel diameter. More preferably the channel length is at least 5 times the channel diameter and even more preferably at least 10 times the channel diameter.

The agitating action can be applied to the whole system or individual channels. The agitation action can also be applied to banks of channels independently or several banks working in opposition. Any suitable method of agitation may be used. The channels may be mounted on a sliding frame or alternatively on bushes, bearings or springs to permit movement. The channel assembly can be shaken by a variety of means such as electrical motors, hydraulic power, electro magnets, or compressed gas.

The process channels are preferably rigid so that the shaking energy can be transmitted efficiently to the channel contents. Examples of channel materials include (but are not limited to) metal, glass, plastic lined metal, ceramic, glass lined metal or plastic. The channels can be mounted vertically, horizontally or at a slope. The orientation of the channel will depend on the nature of process requirements.

Agitators in a variety of shapes and materials of construction may be used. Examples include (but are not limited to) solid cylinders, hollow cylinders, springs, hollow baskets (for holding catalyst or other solids) and spheres. Within a single reactor channel there may be one agitator or many agitators. Where solid agitators are used, it is generally preferable to employ external profiles which are round to promote a rolling action in the channel. The length of the agitators can be the same as the channel length. It is preferable however to use agitators which are less than 300 mm in length. This reduces the problem of unbalanced agitator movement (where the long axis of the agitator deviates from the long axis of the channel). Unbalanced agitator movement promotes axial mixing which is undesirable. Agitators may also be tethered to the channel to partially restrict their movement. The agitator elements may be provided with end caps to guide and control their movement within the channel.

It is preferred that the channels are designed with no internal obstructions so that mixer elements (agitators) and spacers can be inserted and removed at one or either ends of the channels. This simplifies cleaning and assembly.

It is preferred that the channels have removable end caps so that the tubes and internal elements can be accessed for inspection, cleaning or repair.

Process fluid is delivered to the channels by means of a fluid transfer pump. Process fluid may also be delivered to the channels by gravity transfer or a supply vessel with a pressurised head space. Where the process fluid is a gas, this may be delivered to the channel from a pressurised container.

The ATS of this invention can also be used for counter current processes such as extraction or counter current reactions. In counter current flow, it is desirable (and usually necessary) to have unmixed zones to allow for the separation of the light and heavy phases. The light and heavy phases are added at opposite ends of the channels and also taken off at opposite ends to their respective inlet points.

FIG. 6 illustrates such a counter current system.

FIG. 6 shows a tube (22) mounted on an agitator platform (not shown) for mixing by shaking. The tube is provided with a first inlet (23) for a light phase material, a 30 second inlet (24) for a heavy phase material. Outlet pipes (25) and (26) respectively for the light phase and the heavy phase. Agitator elements (27) are provided along the tube optionally provided with agitator guides (28) to provide separated zones (29) to aid separation of the heavy and light phases following their mixing and counter current extraction. Separating zones without mixing are required at the respective inlets points for the light and heavy phases. Additional separating zones may be used as shown or not in some cases.

The ATS design can deliver efficient radial mixing at low (or fast) velocities. The advantage of this is flexibility and that good plug flow and good mixing can be achieved in much shorter channels (for a given volume) compared to statically mixed devices. The benefits of this design include:

1. Significantly improved mixing for a given axial velocity when compared to statically mixed devices.
2. High volumetric capacity in short channels and therefore significantly lower build cost compared to statically mixed systems. For example, 1 liter of reactor capacity in a statically mixed channel of 1 mm diameter would require over 1200 meters of pipe. In the case of a statically mixed reactor, a 40 mm channel of 1 meter would only achieve fast mixing and good plug flow at high flow rates with very short residence times. A liter system of this invention with channel length of 1 meter length and with a channel diameter of 40 mm can deliver good mixing and good plug flow for reaction times from seconds to many hours.
3. Short channels with large diameters of this design have a low pressure drop by virtue of low axial velocity and large channel diameter. They also have good solids handling characteristics by virtue of good mixing and large channel diameters.
4. Systems of this design are inherently simpler to scale up as mixing is less dependent on channel length, channel diameter or fluid velocity when compared with statically mixed systems. The high ratio of radial mixing to axial mixing ensures greater consistency of plug flow during scale up.

Compared to rotational mixers in conventional stirred tank designs, the advantages of this type of mixing are:
1. No wetted drive shafts or magnetic couplings are required to generate movement of the agitator.
2. No mechanical seals are required
3. The agitator elements can move in a transverse action (as opposed to rotational) which is effectively self baffling. This is an efficient mixing method which eliminates the need for baffles (which are difficult to install in channels where agitator drive shafts are present).
4. Good scale up characteristics. Mixing and plug flow are substantially unaffected by scale up, and pressure drop reduces with scale up.

The advantages of flow systems over batch systems have been widely reported and include improved safety, improved yield, faster reaction rates and higher quality. The commercial benefits of the ATS design relate to the fact that it is a flow system which can handle a wide range of processes that would be impossible or prohibitively expensive in other types of flow systems. It is also substantially easier and cheaper to build than multi stage systems which use rotating stirrers.

The ATS can be used as (but not limited to):
Continuous chemical reactors for chemical reactions with homogenous fluids, chemical reactions with slurries, chemical reactions with gas/liquid mixtures, chemical reactions with immiscible liquids, chemical reactions with solid catalysts, chemical reactions with immobilised solid catalyst, counter current chemical reactions and mixtures of these. It is also ideal for reaction times of greater than 30 seconds.
Continuous bio reactors for bio catalysis with live or dead cells, enzyme treatment processes and growth of live cells
Continuous flow systems for mixing or fluid transfer including homogenous and non homogenous fluids.
Continuous flow systems for co current extraction, counter current extraction, crystallisation, dissolving gases or solids or super critical processes The use of an ATS according to the present invention is illustrated by the following example involving the reaction for the oxidation of D-amino acid to give a mixture of L-amino acid and α-keto acid was carried out in the Agitated Tube Reactor (ATR). The results were compared to a 1 liter batch vessel with an agitation speed of 400 rpm. The reaction is multiphase with solids, gas and liquid involved. Oxygen is bubbled through the reaction mixture which contains the D-amino acid, non-immobilized enzymes on whole cells and the substrate alanine.

FIG. 7 below shows the residence time (hours) against conversion (%) for the reaction carried out in a 1 liter ATR and a 1 liter batch vessel. In both reactors, the same amount of oxygen per unit volume was used.

The results show that the ATR achieves a similar conversion to the batch reactor but completes the reaction in 9 hours as against 24 hours in the 1 liter batch reactor. The reaction rate is determined by the dissolution rate of oxygen in the liquid (mass transfer limited). The improved reaction time in the ATR can be attributed to improved mixing efficiency and hence faster mass transfer. This performance difference becomes even more significant with scale up. When a batch reactor is scaled up (by increasedong diameter and length), the mixing efficiency declines. When the ATR is scaled up (by increasing tube length) mixing efficiency remains unchanged.

These results illustrate the benefits of efficient mixing for accelerated reaction rate. Good mixing is not only important for mass transfer limited reactions however, it is also important for orderly flow. FIG. 8 below shows the number of reactor volumes processed by the ATR 1 liter vessel against the conversion achieved. This test was performed to assess the orderly flow capabilities of the ATR.

The graph shows that the ATR reaches a steady rate after 1.7 reactor volumes have been processed which is indicated by the constant conversion after this point. This steady conversion that is achieved indicates that the process fluid is being processed with a constant reaction time i.e. fluid moving through the reactor has a substantially uniform residence time This indicates orderly flow.

Orderly flow is important for controlling reaction time and maximising reaction rate, yield and quality for many types of reaction. In a conventional tubular reactor orderly flow relies on high velocities. In this experiment, the tube diameter was 42 mm. To maintain orderly flow in a tube of this diameter without dynamic mixing would require turbulent flow with a minimum linear velocity of 0.03 m/s. As these results illustrate, the ATR can maintain orderly flow at velocities of 0.00002 meters per second. The commercial implications of this result are substantial. The ATR is more flexible since its performance is not dependent on fluid velocity. It can also deliver good performance in short large diameter tubes with lower pressure drops. Both tube length and pressure drop have a major impact on cost.

The ATS may be used for (but not limited to) scale up studies and manufacturing process in fine chemicals, foods, polymers, bulk chemicals, pharmaceuticals and minerals processing.

The ATS delivers good plug flow and good mixing in short large tubes. Depending on reaction type, these capabilities variously contribute to faster reaction times, smaller equipment, higher yields, higher purity, improved safety and the ability to handle reaction types that would not be possible in a large batch reactor.

The invention claimed is:
1. A continuous flow system comprising:
(a) a channel containing one or more agitators which are of a different density to other fluid components located within the channel, wherein the channel is rigid, and the channel has:
(i) one or more inlets for material at a first end of the channel;
(ii) one or more outlets for material located at a second end of the channel opposite the first end such that the one or more inlets and the one or more outlets are located on an axial path of material movement through the channel; and
(iii) a length of the channel is at least 5 times greater than a diameter of the channel;
(b) a shaking platform for generating shaking of the channel;
wherein material passing through the channel is subject to orderly flow, movement of the one or more agitators is generated by shaking the channel by the shaking platform, a direction of mixing is substantially transverse to a direction of material flow through the channel, and the direction of material flow is axial along the length of the channel; and
wherein the continuous flow system is a dynamically mixed plug flow system.
2. The continuous flow system according to claim 1, wherein a direction of movement of the one or more agitators is limited to a radial plane.

3. The continuous flow system according to claim 1, wherein the one or more agitators is a plurality of agitators; and
wherein the continuous flow system includes agitator guides which prevent the plurality of agitators, which are adjacent to one another, from touching.

4. The continuous flow system according to claim 3, wherein the agitator guides are connected by agitator guide spacers; and
wherein each agitator guide spacer is a rod within the channel that connects the agitator guides.

5. The continuous flow system according claim 1, wherein the channel comprises one or more tubes mounted on the shaking platform and mixing is generated by shaking the one or more tubes.

6. The continuous flow system according to claim 5, wherein the shaking platform retains opposing ends of the one or more tubes.

7. The continuous flow system according to claim 1, the one or more agitators is a loose solid mechanical part.

8. The continuous flow system according to claim 1, wherein an average velocity of the one or more agitators in a radial direction is greater than an axial velocity of the material travelling through the channel.

9. The continuous flow system according to claim 1, wherein a shaking speed of the agitation is between 1 and 100 cycles per second.

10. The continuous flow system according to claim 1, wherein the diameter of the channel is from 10 mm to 100 mm.

11. The continuous flow system according to claim 1, wherein the length of the channel is less than 2 meters.

12. The continuous flow system according to claim 1, wherein the channel comprises a series of channels linked in series.

13. The continuous flow system according to claim 1, wherein the one or more agitators are less than 300 mm in length.

14. The continuous flow system according to claim 1, wherein the one or more agitators are provided with end caps to guide and control movement of the one or more agitators within the channel.

15. The continuous flow system according to claim 1, wherein the channel is provided with a heating/cooling jacket about an exterior of the channel.

16. An apparatus for mixing a continuously orderly flowing stream comprising:
(i) a channel containing one or more agitators which are of a different density to other fluid components located within the channel, wherein the channel is rigid, and the channel has:
(a) one or more inlets for material at a first end of the channel; and
(b) one or more outlets for material located at a second end of the channel opposite the first end such that the one or more inlets and the one or more outlets are located on an axial path of material movement through the channel,
(c) a length of the channel is at least 5 times greater than a diameter of the channel;
(ii) a shaking platform for shaking the channel and to generate movement of the one or more agitators;
whereby a direction of mixing is substantially transverse to a direction of material flow through the channel and the direction of material flow is axial along the length of the channel;
wherein the channel is mounted on the shaking platform; and
wherein the apparatus is a dynamically mixed plug flow system.

17. The apparatus according to claim 16, wherein a direction of movement of the one or more agitators is limited to a radial plane.

18. The apparatus according to claim 16, wherein the diameter of the channel is from 10 mm to 100 mm.

19. The apparatus according to claim 16, wherein the length of the channel is less than 2 meters.

20. The apparatus according to claim 16, wherein the channel comprises a series of channels linked in series.

21. The apparatus according to claim 16, in which the channel is provided with a cooling/heating jacket located about an exterior of the channel.

22. The apparatus according to claim 16, wherein the shaking platform retains opposing ends of the channel.

23. A process for mixing a stream continuously flowing in a channel, wherein the channel is rigid and contains:
(i) one or more agitators which are of a different density to other fluid components located within the channel;
(ii) one or more inlets for material located at a first end of the channel; and
(iii) one or more outlets for material located at a second end of the channel opposite the first end such that the one or more inlets and the one or more outlets are located on an axial path of material movement through the channel;
(iv) a length of the channel is at least 5 times greater than a diameter of the channel; and
wherein the channel is mounted to a shaking platform;
wherein material passing through the channel is subject to orderly flow and movement of the one or more agitators is generated by shaking the channel by the shaking platform;
whereby a direction of mixing is substantially transverse to a direction of material flow through the channel and the direction of material flow is axial along the length of the channel; and
wherein the channel and the shaking platform are part of a continuous flow system which is a dynamically mixed plug flow system.

24. The process according to claim 23, wherein a direction of movement of the one or more agitators is limited to a radial plane.

25. The process according to claim 23, wherein an average velocity of the one or more agitators in a radial direction is greater than an axial velocity of the material travelling through the channel.

26. The process according to claim 23, wherein a shaking speed of the shaking platform is between 1 and 100 cycles per second.

* * * * *